(12) United States Patent
Walker et al.

(10) Patent No.: US 7,839,948 B2
(45) Date of Patent: Nov. 23, 2010

(54) TIME SLICING TECHNIQUES FOR VARIABLE DATA RATE ENCODING

(75) Inventors: Gordon Kent Walker, Poway, CA (US); Vijayalakshmi R. Raveendran, San Diego, CA (US); Christopher John Bennett, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 772 days.

(21) Appl. No.: 11/564,753

(22) Filed: Nov. 29, 2006

(65) Prior Publication Data

US 2007/0165709 A1 Jul. 19, 2007

Related U.S. Application Data

(60) Provisional application No. 60/742,182, filed on Dec. 2, 2005.

(51) Int. Cl.
H04L 27/00 (2006.01)
(52) U.S. Cl. .................. 375/295; 370/280; 370/321; 714/759
(58) Field of Classification Search .............. 375/295; 370/321, 280; 714/759
See application file for complete search history.

(56) References Cited

U.S. PATENT DOCUMENTS

| 5,805,220 | A | | 9/1998 | Keesman et al. |
| 6,151,336 | A | * | 11/2000 | Cheng et al. .............. 370/535 |
| 6,493,388 | B1 | * | 12/2002 | Wang ................. 375/240.12 |
| 7,266,133 | B2 | | 9/2007 | Wu et al. |
| 2004/0090996 | A1 | | 5/2004 | Wu et al. |
| 2005/0036550 | A1 | | 2/2005 | Koba et al. |

FOREIGN PATENT DOCUMENTS

| EP | 1071234 | 1/2001 |
| EP | 1542383 | 6/2005 |
| WO | 9529545 | 11/1995 |
| WO | 0041395 | 7/2000 |
| WO | WO07114862 A2 | 10/2007 |

OTHER PUBLICATIONS

International Search Report—PCT/US06/061566, International Search Authority—European Patent Office—Mar. 5, 2008.
Written Opinion - PCT/US06/061566, International Search Authority- European Patent Office - Mailed on Mar. 5, 2008.

* cited by examiner

*Primary Examiner*—Ted M Wang
(74) *Attorney, Agent, or Firm*—Gerald P. Joyce, III (57) ABSTRACT

The disclosure is directed, to a multi-channel encoder. The multi-channel encoder is configured to generate an encoded data stream. The multi-channel encoder includes a plurality of channel encoders, and a processor configured to allocate time slots in the encoded data stream to each of the channel encoders to vary the rate of data provided by each of the channel encoders into the encoded data stream.

29 Claims, 5 Drawing Sheets

TIME SLICING TECHNIQUES FOR VARIABLE DATA RATE ENCODING

CLAIM OF PRIORITY UNDER 35 U.S.C. §119

The present Application for Patent claims priority to Provisional Application No. 60/742,182 entitled "Variable Data Rate Delivery With Fixed Or Quasi Fixed Data Burst Size," filed Dec. 2, 2005, and assigned to the assignee hereof and hereby expressly incorporated by reference herein.

BACKGROUND

1. Field

The present disclosure relates generally to telecommunication system, and more particularly, to time slicing concepts for variable data rate encoding.

2. Background

Digital video and audio compression technologies have ushered in an era of explosive growth in digital multimedia application. Since the early 1990's, international standards groups such as, for example, the Video Coding Experts Group (VCEG) of ITU-T and -the Motion Pictures Expert GROUP of ISO/IEC, have developed international video recording standards. The standards developed include, for example. :MPEG-1, MPEG-2, MPEG-4 (collectively referred to as MPEG-x), H.261, H.262, H.263, and AVC/H.264 (collectively referred to as H.26x).

The MPEG-x and H.26x standards describe data processing and manipulation techniques that are well suited for the compression and delivery of video, audio and other information. In particular, the above-referenced standards, and other hybrid coding standards and techniques compress video information using intra-frame coding techniques (such as, for example, run-length coding, Huffman coding and the like) and inter-frame coding techniques (such as, for example, forward and backward predictive coding, motion compensation and the like).

Inter-frame coding exploits the fact that there, are very few differences between two adjacent frames in a video sequence. Often the only difference is that some parts of the imagine have shifted slightly between frames. Inter-frame prediction coding can be used to partition a current frame into a macroblocks (i.e., a group of pixels) and search an adjacent frame., or reference frame, to determine whether the macroblock has moved. If the content of the macroblock in the current frame can be located in a reference frame, then it does not need to be reproduced, The content can be represented by a "motion vector" indicating its displacement in the current frame from its position in the reference frame and the difference between the two macroblocks. Intra-frame prediction coding, or the other hand, is performed without reference to an any frame and therefore, requires significantly more bandwidth than a frame with inter-picture prediction coding. Intra-picture frame is generally used to launch a new scene in a video sequence.

These standards and coding techniques are widely deployed today, in digital multimedia applications for wireless networks. In these applications, compressed data from various content providers maybe distributed to a large number of access terminals using a technique know as time slicing. "Time slicing" is the time-division multiplexing of services from various content providers. In other words, the data of one particular service is not broadcast continuously, but rather in periodic bursts. This approach tends to conserve power at the access terminal because only the parts of the data stream which carry the data of the service currently selected by the viewer have to be processed. However the amount of data contained in a burst must be sufficient to support continuous playback on the viewer device until the next burst of data is received.

SUMMARY

One aspect of a multi-channel encoder is disclosed The multi-channel encoder is con-figured to generate an encoded data stream. The multi-channel encoder includes a plurality of channel encoders, and a processor configured to allocate time slots in the encoded data stream to each of the channel encoders to vary the rate of data provided by each of the channel encoders into the encoded data stream.

A method of generating an encoded data stream is disclosed. The method includes encoding data on a plurality of channel, allocating time slots in the encoded data stream for the encoded data on each of the channels to vary the data rate of the encoded data on each of the channels in the encoded data stream, and providing the encoded data on each of the channels into the data stream in the allocated time slots.

Another aspect of a multi-channel encoder is disclosed. The multi-channel encoder is configured to generate an encoded data stream. The multi-channel encoder includes means for encoding data on a plurality of channels, means for allocating time slots in the encoded data stream to the encoded data on each of the channels to vary the data rate of the encoded data on each of the channels in the encoded data stream, and means for providing the encoded data on each of the channels into the data stream in the allocated time slots.

A computer program product is disclosed. The computer-program product includes computer-readable medium comprising code for causing a computer to encode data on a plurality of channels, provide the encoded data on each of the channels into an encoded data stream, and allocate time slots in the encoded data stream for the encoded data on each of the channels to vary the data rate of the encoded data on each of the channels in the encoded data stream.

It is understood that other embodiments of the present invention will become readily apparent to those skilled in the art from the following detailed description, wherein it is shown and described only various embodiments of the invention by way of illustration As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a communications system are illustrated by way of example, and not by way of limitation, in the accompany drawing, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention many be practiced without these specific details. In some instances, well known structures and components are shown in block diagram form in order to avoid obscuring the concepts of the invention.

In the following detailed description, various concepts will be described for multimedia streaming over a wireless network. While these concepts are well suited for this application, those skilled in the art will readily appreciate that these concepts can be extended to a variety of other applications. Accordingly, any reference to multimedia streaming over a wireless network is intended only to provide context for the various concepts described, with the understanding that these concepts have a wide range of applications.

Figure 1:
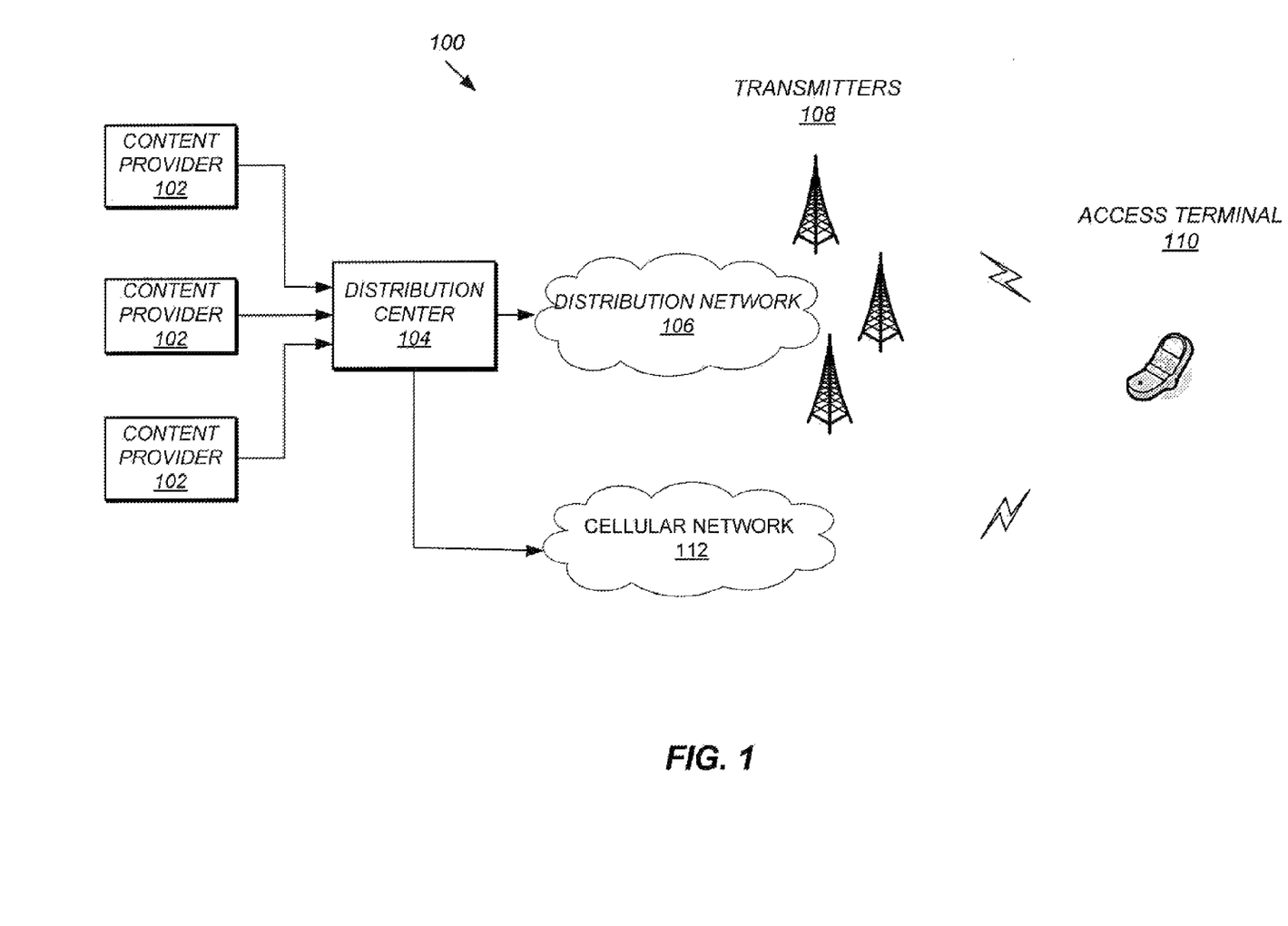
FIG. 1 is a conceptual block diagram illustrating a example of a broadcast system.

FIG. 1 is a conceptual block diagram illustrating an example of a broadcast system that could benefit firm the concepts described throughout this disclosure. The broadcast system may be a Digital Video Broadcasting for Handhelds (DVB-H) system, an Integrated Services Digital Broadcasting for Terrestrial Television Broadcasting (ISDB-T) system, or any other suitable broadcast system over wireless networks.

The broadcast system 100 is shown with multiple Content providers 102 that provide data to a distribution center 104. The data may include multimedia content such as real-time and non-real-time video, audio, clips, scripts, programs, or any other suitable content. The data from the various content providers 102 is combined at the distribution center 104 for delivery to consumers through a distribution network 106. The distribution network 106 may be a packet-based network, such as the Internet, an intranet, a private Internet Protocol (IP) network, or any other suitable wired and/or wireless distribution network.

A user on an access terminal 110 may access the data provided by the distribution center 104 through a network of transmitters 108, or any other suitable wireless access point to the distribution network 106. The access terminal 110 may be a mobile telephone, a personal digital assistant (PDA), a personal or laptop computer, or other device capable of receiving content.

The wireless connection between the access terminal 110 and the transmitters 108 may be implemented with any suitable air interface including, by way of example, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier ("1X") radio transmission technology (RTT), evolution data only (EV-DO) technology, general packet radio service (GPRS), enhanced data GSM environment (EDGE), high speed downlink data packet access (HSPDA), analog and digital satellite systems, IEEE 802.11, Worldwide Interoperability for Microwave Access (WiMax), or any other suitable wireless technologies/protocols.

In the configuration of the broadcast system 100 shown in FIG. 1, the access terminal 110 may access data from the distribution center 104 over a cellular network 112. In this configuration, the data from the distribution center 104 may be provided by a packet-based network to one or more packet data serving nodes in the cellular network 112 and broadcast to the access terminal 110 through a network of base transceiver stations. One or more access terminal 110 may be capable of accessing data over both the distribution network 106 and the cellular network 112. By way of example, an access terminal 110 may be configured to receive to multicast presentation over the distribution network 106 and unicast presentation over the cellular network 112. Alternatively, or in addition to, the cellular network 112 may he used to authenticate users and deliver encryption keys for multicast presentations.

Figure 2:
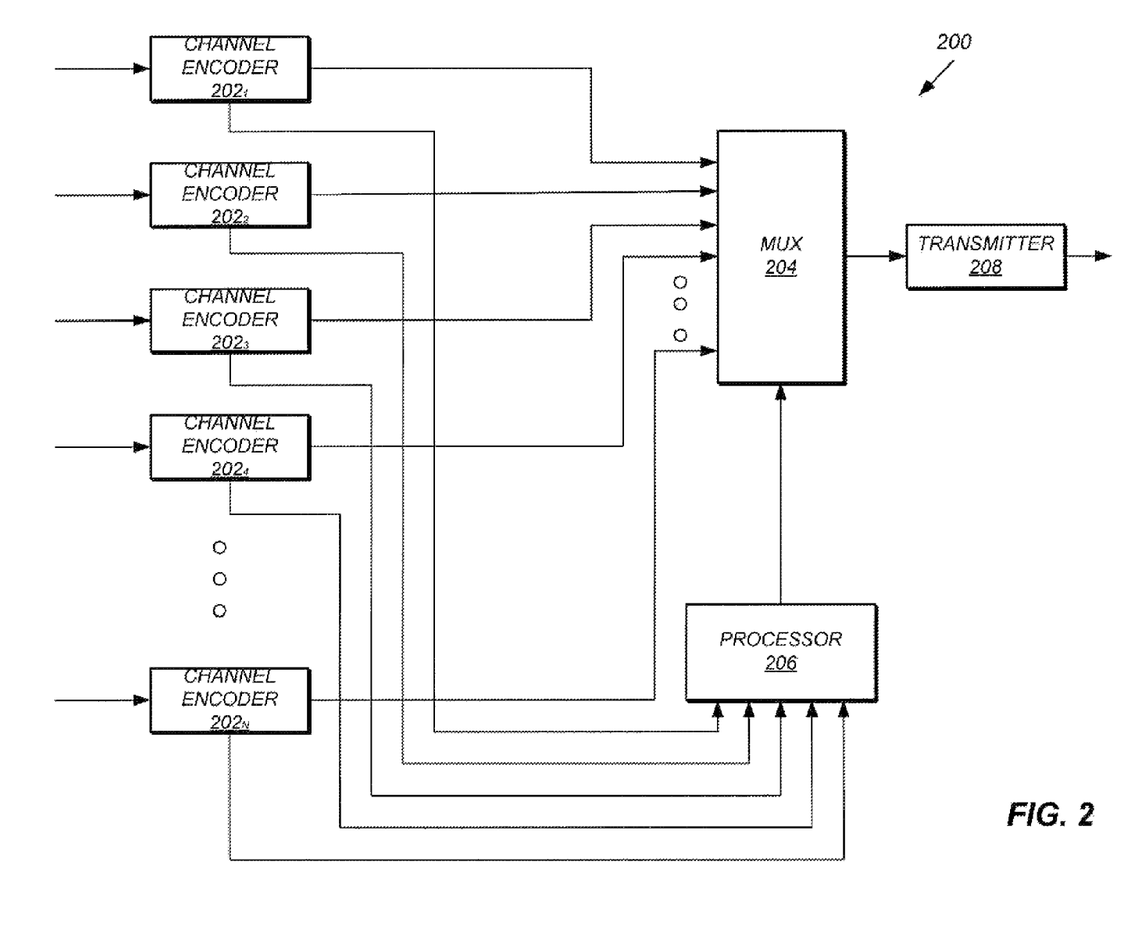
FIG. 2 is a block diagram illustrating the functionality of a distribution center.

FIG. 2 is a block diagram illustrating the functionality of a distribution center. The distribution center 104 includes a multi-channel encoder 200 having a number of channel encoders 202. Each channel encoder 202 encodes data from a content provider using intra-frame coding techniques (such as, for example, run-length coding, Huffman coding and the like) and/or inter-frame coding techniques (such as, for example, forward and backward predictive coding, motion compensation and the like). The encoded data produced by each channel encoder 202 is provided to a multiplexer 204. Under the control of a processor 206, the multiplexer 204 time slices the encoded data from the channel encoders 202 into an encoded data stream. The encoded data stream is provided to a transmitter 208 for delivery to consumers through the distribution network 106 (see FIG. 1).

Figure 3:
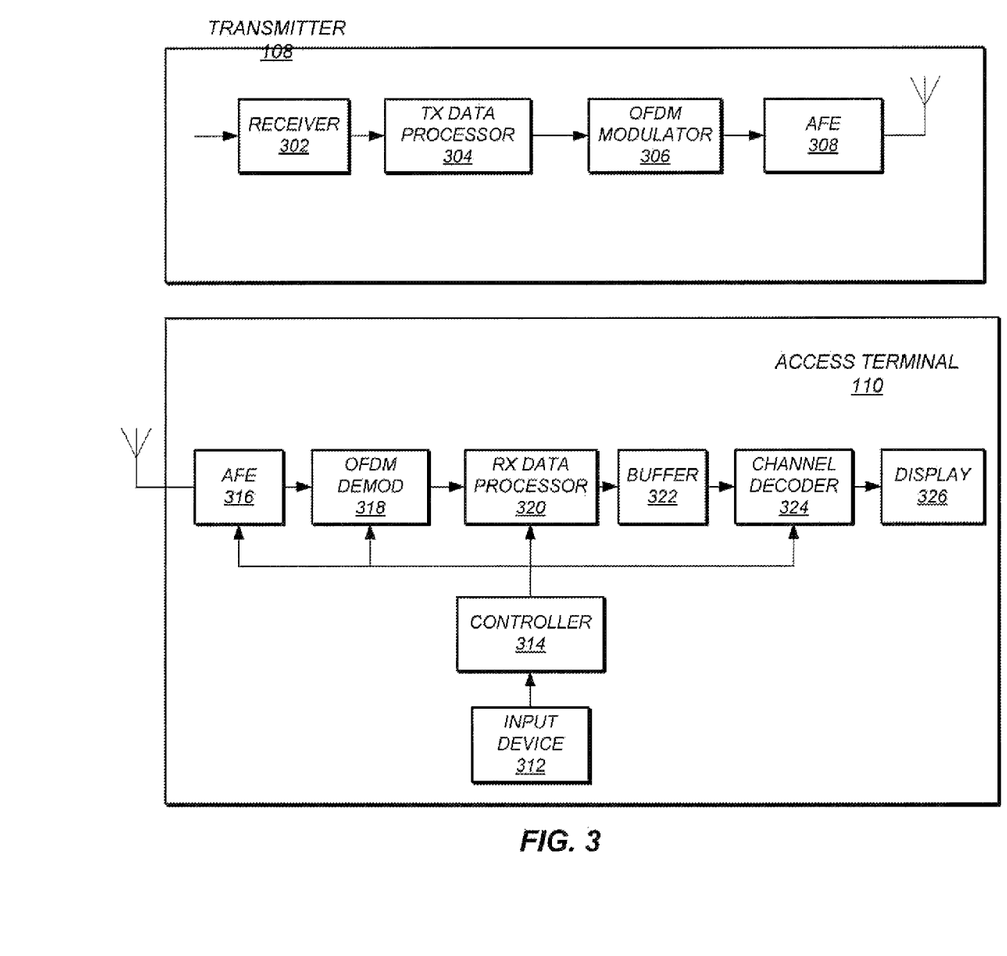
FIG. 3 is a block diagram illustrating the functionality of a transmitter and access terminal in a broadcast system.

FIG. 3 is a block diagram illustrating the functionality of a transmitter and access terminal in a broadcast system. In one at least one configuration of a broadcast system, multiple subcarriers are used to implement the air interface between a transmitter 208 and the access terminal 110. Multiple subcarriers may be implemented using OFDM or some other modulation technique. OFDM is a modulation technique that allows content to be modulated onto tones or sub-carriers. These tones are spaced apart at precise frequencies to provide orthogonality. The data stream is modulated onto tones by adjusting the tones' phase, amplitude or both. Typically, quadrature phase shift keying (QPSK) or quadrature amplitude modulation (QAM) is used, but other modulation schemes may also be used.

The transmitter 108 includes a receiver 302 configured to receive the encoded data stream from the distribution center 104 (see FIG. 1). A transmit data processor 304 processes (e.g., turbo codes, interleaves, and modulates) the encoded data stream to produce a series of modulation symbols, which are complex values for points in a signal constellation for a modulation scheme (e.g., QPSK, QAM, and so on). The modulation symbols are provided to an OFDM modulator 304, which multiplexes the modulation symbols onto the proper subbands and symbol periods to generate OFDM symbols. An AFE 308 modulates a carrier signal with the OFDM symbols and transmits the modulated signal to the access terminal 110 through an antenna 310.

A user on the access terminal 110 may select a service from a content provider by manipulating an input device 312, such as a keypad. A controller 314 nay be used to activate the analog front end (AFE) 316, the demodulator 318, and the receive data processor 320 periodically (ie., when receiving data bursts from the selected service). When activated, the AFE 316 conditions (eg., filters, amplifies, frequency down-converts, etc.) the modulated signal and digitizes the result to recover a stream of OFDM symbols, The OFDM demodulator 318 processes the OFDM symbols to obtain estimates of the modulation symbols sent by the transmitter 108. The receive data processor 320 processes (e.g., symbol demaps, deinterleaves, decodes, etc.) the modulation symbol estimates from the OFDM demodulator 318 to recover the encoded data for the selected service. The encoded data is stored in a buffer 322 to allow a continuous data stream to be read out of the buffer 322 and provided to a channel decoder 324. The channel decoder 324 is used to fully reconstruct the frames in the video sequence for presentation to a display 326.

The time slicing process used to generate the encoded data stream will be discussed with reference to FIG. 2. In at least one configuration, each channel encoder 202 estimates the data rate it requires based on the informational content of the data it receives from a content provider. Based on these data rate estimates, the processor 206 allocates the time to each channel encoder 202. The processor 206 uses these time allocations to control the multiplexer 204 to produce a continuous, uninterrupted encoded data stream at the output of the multi-channel encoder 200.

Figure 4A:
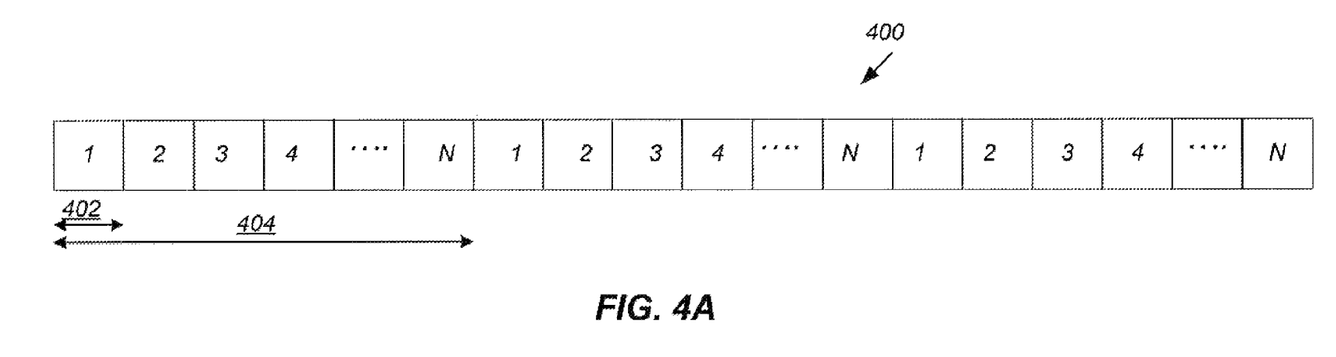
FIG. 4A is a timing diagram illustrating an example of encoded data stream output from the nulti-channel encoder.

FIG. 4A is a timing diagram illustrating all example of encoded data stream output from the multi-channel encoder. Referring to FIGS. 2 and 4A, the data from each content provider is encoded by a channel encoder 202 and allocated a time slot 402 in a broadcast cycle 404 by the processor 206. The broadcast cycle 404 is repeated to create the encoded data stream 400. The nominal rate of data from each channel encoder 202 in the encoder data stream is based on the data burst size (i.e., the amount of data that can be transmitted in one time slot) and the duration of the broadcast cycle (i.e., the time between each burst of data of one particular content provider). By way of example, a time slicing process that allocates one time slot to each of N number of content providers in a 5 second broadcast cycle, with each time slot supporting a 2 Mb data burst, can sustain a nominal data rate of 400 Kb/sec in the encoded data stream. In this example, the data burst size is fixed, however, in alternative configurations of the multi-channel encoder 200, the data burst size may be variable.

The nominal data rate for each channel encoder resulting from the time slot allocations in FIG. 4A may be sustainable over a long period of time for a typical video sequence. However, a channel encoder may experience periods of time where a higher data rate is required to support the broadcast of a number of frames with intra-picture coding due to rapid scene changes, or a number of frames with inter-picture coding that contain high informational content due to significant changes in the picture content from frame-to-frame. The time slicing process implemented by the processor 206 may be configured to handle this situation.

In one configuration of the multi-channel encoder 200, the processor 206 receives the data rate estimates from each channel encoder 202. If each data rate estimate can be supported by one time slot per broadcast cycle, then the processor 206 may allocate time slots to the channel encoders 202 as shown in FIG. 4A. These time slot allocations will be referred to as "default time slot assignments." In this example, each channel encoder 202 has a default time slot assignment that it uses when the processor 206 does not need to manage the data rates of the channel encoders (i.e., the data rate requirements for each channel encoder can be met with a one time slot allocation per broadcast cycle). By way of example, the default slot assignment for the first channel encoder $202_1$ is the first time slot in the broadcast cycle, the default slot assignment for the second channel encoder $202_2$ is the second time slot in the broadcast cycle, and so on.

The default time slot assignments may be reallocated by the processor 206 when the data rate requirements of one or more channel encoders 202 increases. When this occurs, the processor 206 attempts to arrive at a solution that would best serve the data rate requirements for all channel encoders. This solution may require giving default time slot assignments for channel encoders 202 with low data rate requirements to channel encoders 202 with high data rate requirements over an observation period. By way of example, a channel encoder 202 may determine that it can sustain a data rate of 50 Kb/sec because the informational content of the data is low. This might be the case where the video sequence is a "talking head" image. In this case, a time slot with a data burst Size of 2 Mb can be allocated to that channel encoder 202 every 40 seconds. If the time slicing process supports 8 channel encoders 290 (ie., N=8) and has a broadcast cycle of 5 seconds, the processor 206 can allocate one time slot to that channel encoder 202 every 8 broadcast cycles, thus freeing up additional time slots for channel encoders 202 with high data rate requirements.

In multimedia streaming applications, the minimum observation period may be adaptive and set to a time period that results in a single time slot allocation for the channel encoder 240 with the lowest data rate requirements. The observation period could be shortened by allocating fractional time slots to the channel encoder 202. By way of example a 1 Mb portion of a time slot could be allocated to a channel encoder 202 with a 50 Kb/sec data rate requirement over a 20 second observation period. A shorter observation period may allow the processor 206 to react to changes in the data content more rapidly and provide shorter acquisition times when the access terminal 110 (see FIG. 1) selects a new service. Alternatively, the observation period may be set to a fixed period based on the minimum data rate expected. A fixed observation period is easier to manage, and therefore may reduce the complexity of the processor 206. However, an adaptive observation period allows the processor 206 the flexibility to better serve the data rate requirements of all channel encoders 202. Those skilled in the art will be readily able to access the performance tradeoffs to meet any particular application.

Figure 4B:
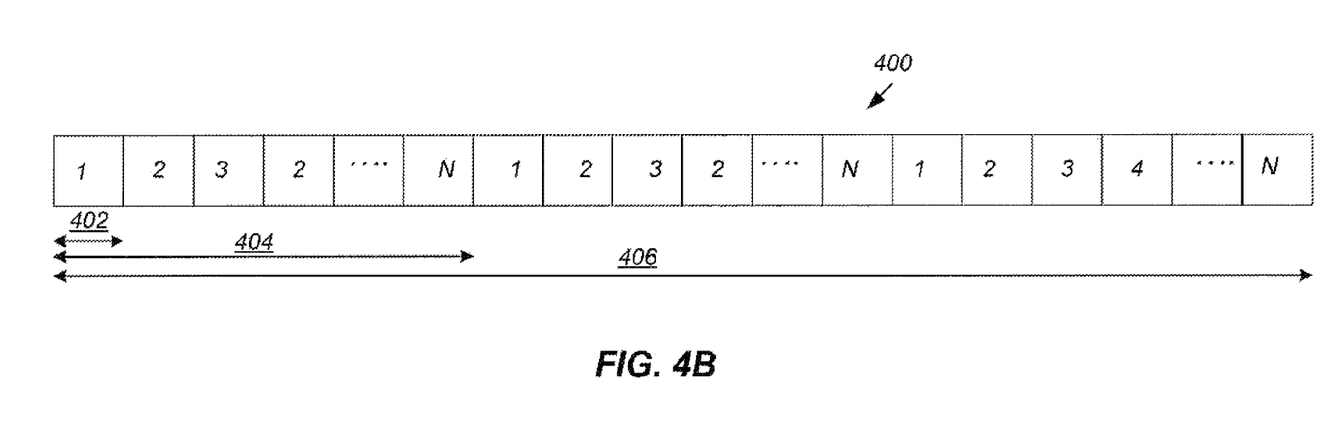
FIG. 4B is a timing diagram illustrating another example of encoded data stream output from the multi-channel encoder.

Another example of time slot allocations in an encoded data stream is shown in FIG. 4B. The observation period 406 in this example is 3 broadcast cycles. Referring to FIGS. 2 and 4B, the first and third channel encoders $202_1$, $202_3$ use their default time slot assignments to transmit encoded data in the encoded data stream at the nominal data rate, The fourth channel encoder $202_4$ is given its default slot assignment in only the third broadcast cycle of the observation period, and therefore, transmits encoded data in the encoded data stream at ⅓ the nominal data rate. This time slot allocation allows the processor 206 to give the default slot assignment of the fourth channel encoder $202_4$ in the first and second broadcast cycles to the second channel encoder $202_2$. As a results the second channel encoder $202_2$ transmits encoded data in the encoded data stream at. ⅔ the nominal data rate with two time slot allocations in the first two broadcast cycles and on time slot allocation in the third broadcast cycle.

As discussed earlier, the processor 206 performs a time slicing process by which an observation period is selected with time slot allocations to best support the data rate requirements of each channel encoder 202. In addition to the data rate requirements, the selection of the observation period and the time slot allocations may also be based on the buffer requirements for the channel decoders in the various access terminals. As discussed in connection with FIG. 3, a buffer 322 is used to store the encoded data to allow a continuous data stream to be read out of the buffer 322 and provided to the channel decoder 324. In other words, the observation period, the data rate, and the position of the time slot allocations within the observation period should be selected by the processor 206 to ensure that the buffer 322 in the access terminal does not empty while the encoded data is continuously read out of the buffer 322 by the video decoder 324. By modeling the buffer for a channel decoder for each content provider, the processor 206 can determine whether the data rate needs to be increased, or the position of the time slot allocations or the duration of the observation period needs to be adjusted.

Referring to FIG. 2, the processor 206 may be configured to tag the encoded data assigned to each time slot. The tag informs the controller 314 (see FIG. 3) about the time slot allocations for the channel encoders 202. In at lease one configuration of the multi-channel encoder 200, the tag includes two indicators. The first indicator in a tag of a time slot identifies the channel encoder 202 assigned to that time slot. The second indicator in a tag of a time slot identifies the next time slot assignment for the channel encoder 202 whose default time slot assignment is that time slot. Turning to FIG. 4B for an example, the second time slot in the first broadcast cycle would include a tag with a first indicator that informs the controller in the access terminal that the second channel encoder has been assigned that time slot, and a second indicator that informs the controller that the next time slot allocation for the second channel encoder is the fourth time slot in the first broadcast cycle. The forth time slot in the first broadcast cycle would include a tag with a first indicator that informs the controller that the second channel encoder $202_2$ has been assigned that time slot, and a second indicator that informs the controller that the next time slot allocation for the forth channel encoder is the fourth time slot in the third broadcast cycle. No tags are required for the first and third time slots of each broadcast cycle because the first and second channel encoders have their default time slot assignments. This approach allows a channel decoder in an access terminal to join or rejoin a video sequence.

Figure 5:
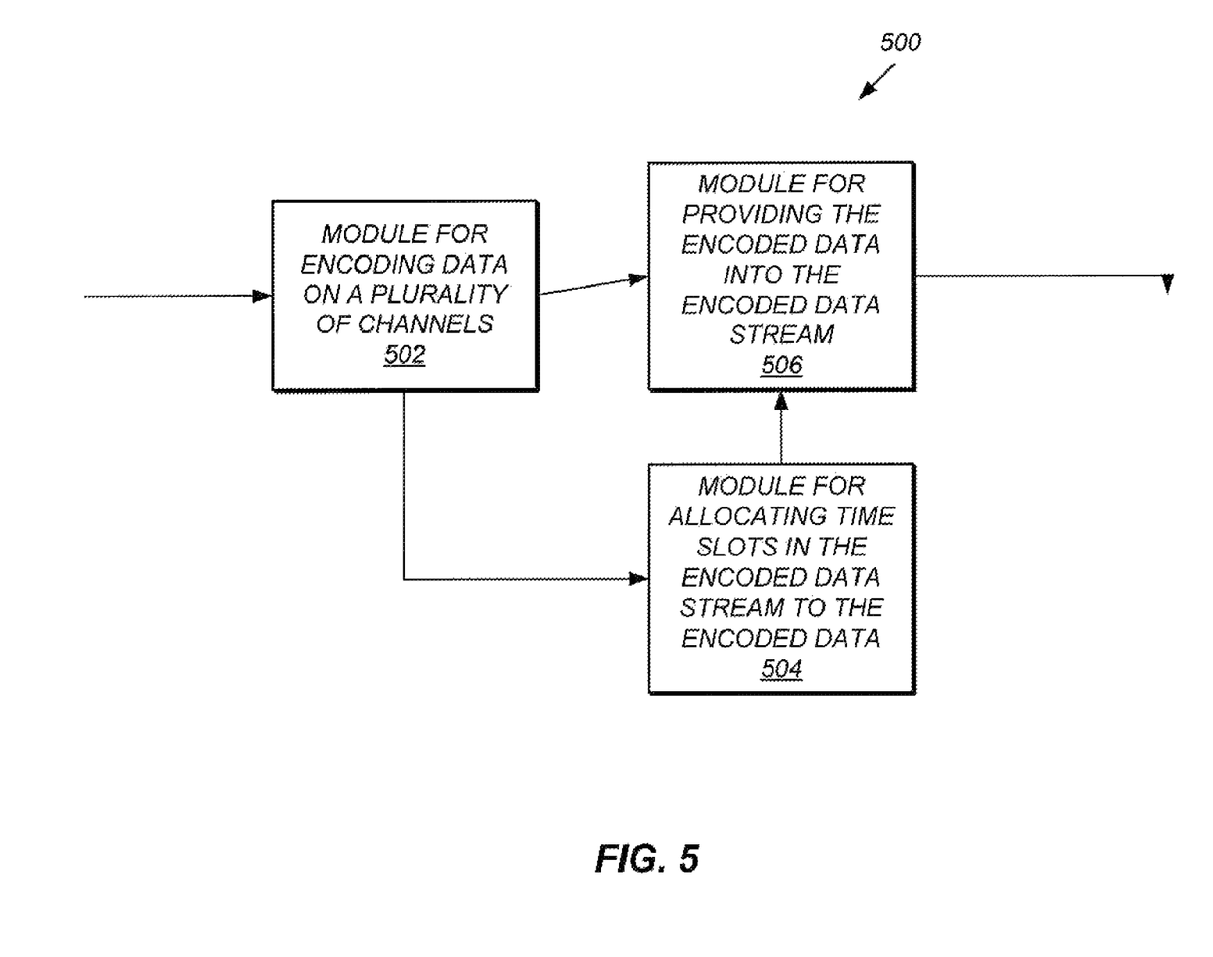
FIG. 5 is a block diagram illustrating the functionality of multi-channel encoder.

FIG. 5 is a block diagram illustrating the functionality of multi-channel encoder. The multi-channel encoder 200 is configured to generate an encoded data stream. The multi-channel encoder includes a module 502 for encoding data on a plurality of channels, a module 504 for allocating time slots in the encoded data stream to the encoded data on each of the channels to vary the data rate of the encoded data on each of the channels in the encoded data stream, and a module 506 for providing the encoded data on each of the channels into the data stream in the allocated time slots.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, butt in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium in the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claims element is to be construed under the provisions of 35 U.S.C. §112, sixth paragraph, unless the element is expressly recited using the phrase "means for" or, in the case of a method claim, the clement is recited using the phrase "step for."

What is claimed is:

1. A multi-channel encoder configured to generate an encoded data stream, comprising:
   a plurality of channel encoders; and
   a processor configured to allocate time slots in the encoded data stream to each of the channel encoders to vary the rate of encoded data provided by each of the channel encoders into the encoded data stream by varying how many time slots are allocated to selected channel encoders over an observation period.

2. The multi-channel encoder of claim 1 further comprising a multiplexer configured to provide the encoded data from each of the channel encoders into the encoded data stream in the time slots allocated by the processor.

3. The multi-channel encoder of claim 1 wherein each of the time slots in the encoded data stream has a fixed data burst size.

4. The multi-channel encoder of claim 1 wherein the processor is further configured to allocate the time slots in the encoded data stream to the channel encoders based on the data rate requirements of each of the channel encoders.

5. The multi-channel encoder of claim 1 wherein the processor is further configured to allocate the time slots in the encoded data stream to the channel encoders to ensure that a channel decoder buffer that receives the encoded data in the encoded data stream from one of the channel encoders does not empty while the received encoded data is read out of the buffer.

6. The multi-channel encoder of claim 1 wherein the processor is further configured to select the observation period in the encoded data stream to allocate the time slots to the channel encoders.

7. The multi-channel encoder of claim 6 wherein the observation period selected by the processor results in a one slot allocation to the channel encoder with the lowest data rate requirement.

8. The multi-channel encoder of claim 1 wherein the encoded data stream comprises a plurality of broadcast cycles, and wherein each of the channel encoders has a default time slot assignment in the broadcast cycle, the processor being further configured to allocate the default time slot assignments to each of the channel encoders, the default time slot assignments resulting in a nominal rate of encoded data in the encoded data stream for each of the channel encoders, wherein the nominal rate of encoded data in the encoded data stream satisfies the data rate requirements for each of the channel encoders.

9. The multi-channel encoder of claim 1 wherein the encoded data stream comprises a plurality of broadcast cycles, and wherein each of the channel encoders has a default time slot assignment in the broadcast cycle, the processor being further configured to tag the encoded data in each of the time slots, the tag indicating the next time slot allocation for the channel en-coder having the default time slot assignment with that tag.

10. The multi-channel encoder of claim 1 wherein the processor is further configured to tag the encoded data in each of the time slots, the tag indicating the channel encoder allocated by the processor to the time slot with that tag.

11. The multi-channel encoder of claim 1 wherein the processor is further configured to allocate time slots in the encoded data stream to the channel encoders in fractional time slots.

12. A method of generating an encoded data stream, comprising:
    encoding data on a plurality of channels with a plurality of channel encoders;
    allocating time slots in the encoded data stream for the encoded data on each of the channels with a processor to vary the data rate of the encoded data on each of the channels in the encoded data stream by varying how many time slots are allocated to selected channels over an observation period; and
    providing the encoded data on each of the channels into the data stream in the allocated time slots.

13. The method of claim 12 wherein each of the time slots in the encoded data stream has a fixed data burst size.

14. The method of claim 12 wherein the time slot allocations are based on the data rate requirements of the data encoded on each of the channels.

15. The method of claim 12 wherein the time slot allocations are made to ensure that a channel decoder buffer that receives the encoded data in the data stream on one of the channels does not empty while the received encoded data is read out of the buffer.

16. The method of claim 12 wherein the data stream comprises a plurality of broadcast cycles, and wherein the encoded data on each of the channels has a default time slot assignment in the broadcast cycle, the method further comprising tagging the data in each of the time slots, the tag indicating the next time slot allocation for the encoded data on the channel having the default time slot assignment with that tag.

17. The method of claim 12 further comprising tagging the encoded data in each of the time slots, the tag indicating the encoded data on the channel allocated to the time slot with that tag.

18. A multi-channel encoder configured to generate an encoded data stream, comprising:
    means for encoding data on a plurality of channels;
    means for allocating time slots in the encoded data stream to the encoded data on each of the channels to vary the data rate of the encoded data on each of the channels in the encoded data stream by varying how many time slots are allocated to data on selected channels over an observation period; and
    means for providing the encoded data on each of the channels into the data stream in the allocated time slots.

19. The multi-channel encoder of claim 18 wherein each of the time slots in the encoded data stream has a fixed data burst size.

20. The multi-channel encoder of claim 18 wherein the means for allocating time slots is configured to allocate the time slot based on the data rate requirements of the data encoded on each of the channels.

21. The multi-channel encoder of claim 18 wherein the means for allocating time slots is configured to allocate time slots to ensure that a channel decoder buffer that receives the encoded data in the data stream on one of the channels does not empty while the received encoded data is continuously read out of the buffer.

22. The multi-channel encoder of claim 18 wherein the data stream comprises a plurality of broadcast cycles, and wherein the encoded data on each of the channels has a default time slot assignment in the broadcast cycle, the multi-channel encoder further comprising means for tagging the data in each of the time slots, the tag indicating the next time slot allocation for the encoded data on the channel having the default time slot assignment with that tag.

23. The multi-channel encoder of claim 18 further comprising means for tagging the encoded data in each of the time slots, the tag indicating the encoded data on the channel allocated to the time slot with that tag.

24. A computer program product, comprising:
    a tangible computer-readable medium comprising code for causing a computer to:
    encode data on a plurality of channels;
    provide the encoded data on each of the channels into an encoded data stream; and
    allocate time slots in the encoded data stream for the encoded data on each of the channels to vary the data rate of the encoded data on each of the channels in the encoded data stream by varying how many time slots are allocated to encoded data on selected channels over an observation period.

25. The computer program product of claim 24, wherein each of the time slots in the encoded data stream has a fixed data burst size.

26. The computer program product of claim 24 wherein the code further causes a computer to allocate the time slot based on the data rate requirements of the data encoded on each of the channels.

27. The computer program product of claim 24 wherein the code further causes a computer to allocate the time slots to ensure that a channel decoder buffer that receives the encoded data in the data stream on one of the channels does not empty while the received encoded data is continuously read out of the buffer.

28. The computer program product of claim 24 wherein the data stream comprises a plurality of broadcast cycles, and wherein the encoded data on each of the channels has a default time slot assignment in the broadcast cycle, the code further causing a computer to tag the data in each of the time slots, the tag indicating the next time slot allocation for the encoded data on the channel having the default time slot assignment with that tag.

29. The computer program product of claim 24 wherein the code further causes a computer to tag the encoded data in each of the time slots, the tag indicating the encoded data on the channel allocated to the time slot with that tag.

* * * * *